United States Patent
Modina et al.

(10) Patent No.: US 10,046,259 B2
(45) Date of Patent: Aug. 14, 2018

(54) POLYMER FILTERING MATERIAL WITH A HIGH ACCUMULATION CAPACITY

(71) Applicant: Filtrec S.P.A., Telgate, Bergamo (IT)

(72) Inventors: Sergio Modina, Brescia (IT); Marco Indrieri, Brescia (IT); Chantal Erika Speziali, Brescia (IT)

(73) Assignee: Filtrec S.P.A., Cazzago San Martino, Brescia (IT)

( * ) Notice: Subject to any disclaimer, the term of this patent is extended or adjusted under 35 U.S.C. 154(b) by 53 days.

(21) Appl. No.: 15/159,144

(22) Filed: May 19, 2016

(65) Prior Publication Data

US 2016/0339372 A1    Nov. 24, 2016

(30) Foreign Application Priority Data

May 22, 2015  (IT) .......................... 102015000016798
May 22, 2015  (IT) .......................... 102015000016829

(51) Int. Cl.
*B01D 39/16* (2006.01)

(52) U.S. Cl.
CPC ....... *B01D 39/163* (2013.01); *B01D 39/1623* (2013.01); *B01D 2239/0241* (2013.01); *B01D 2239/065* (2013.01); *B01D 2239/1233* (2013.01)

(58) Field of Classification Search
CPC .............. B01D 39/163; B01D 39/1623; B01D 2239/1233; B01D 2239/065; B01D 2239/0241

USPC ................................ 210/490, 491, 503–507
See application file for complete search history.

(56) References Cited

U.S. PATENT DOCUMENTS 8,590,712 B2 * 11/2013 Wieczorek ........... B01D 17/045
                                                                  210/295
2005/0067346 A1 * 3/2005 Noack .................. B01D 53/228
                                                                  210/503

\* cited by examiner

*Primary Examiner* — Madeline Gonzalez
(74) *Attorney, Agent, or Firm* — MacMillan, Sobanski & Todd, LLC

(57) ABSTRACT

A filtering multilayer is described, having at least two layers, one input layer and one output layer, made of non-woven fabric, wherein each fiber of said non-woven fabric consists of a polymer matrix of thermoplastic material, wherein the average diameter of the fibers that form the input layer is larger than the average diameter of the fibers that form the output layer, characterized in that the diameters of the fibers that form the input layer and the output layer have a Gaussian distribution, wherein the diameter of the single fibers that form said input layer varies around the average with a normal distribution of width at least equal to 10% of the average value and the diameter of the single fibers that form said output layer varies around the average with a normal distribution of width at least equal to 14% of the average value. In a preferred embodiment, said polymer matrix contains a carbon-based filler or additive, preferably in the form of powder.

14 Claims, 1 Drawing Sheet
(1 of 1 Drawing Sheet(s) Filed in Color)

Input layer

Intermediate layer

Output layer ated herein
POLYMER FILTERING MATERIAL WITH A HIGH ACCUMULATION CAPACITY

CROSS-REFERENCE TO RELATED APPLICATIONS

This application claims the priority to Italian Application No. 102015000016798 filed May 22, 2015, and Italian Application No. 102015000016829 filed May 22, 2015, the entire disclosures of which are expressly incorporated herein by reference.

BACKGROUND

Filtering materials are used for removing undesired material from a fluid, forcing the flow of fluid through the filter.

In the prior art, glass microfiber is widely used in filtration. Glass microfiber ensures a high mechanical, chemical and physical resistance with good filtering performance. The drawbacks that have always accompanied the use of this material are related to the non-incinerability and to the hazard to the health and safety of the people involved in the various production steps.

Polymer microfibers assembled to form multilayer filters have been proposed as an alternative. These filters obviate the environmental problem by excluding the use of fiberglass and maintaining acceptable filtering efficiency features.

However, a problem is strongly felt when using this type of product alternative to fiberglass: an accumulation capacity lower than that observed using fiberglass.

WO2007126621 describes a multilayer filtering system wherein the fibers are made of polybutylene naphthalate (PBN). In a first layer, the fibers have a diameter of between 0.5 and 8 microns, in a second layer between 10 and 35 microns.

US2001/0309012 also describes a polymer multilayer filtering system which comprises at least two layers: a loading layer, where the fibers have a diameter of 5-30 microns and a basic weight of 30-100 g/m$^2$, and an efficiency layer where the fibers have a diameter of 0.5-3 microns and a basic weight of 40-150 g/m$^2$. In said multilayer, the object is achieved by using two-component fibers, i.e. comprising a portion of thermoplastic fibers having a certain melting point and a second portion of fibers having a lower melting point.

While the two filters described above solve the environmental problem, they do not reach the filtering efficiency and the accumulation capacity reached by the use of fiberglass.

In addition, in the fluid filtration field, and in particular in the field of filtration of liquids such as oils and fuels, there are substantial problems related to the formation of electrostatic charges.

Flowing through a non-conductive filtering material, as a polymer, ceramic and/or fiberglass material typically is, oils and fuels promote the formation of charge accumulations due to triboelectric effect. The electrostatic charge thus accumulated causes discharges which damage the integrity, efficiency and correct operation of the filter and, under certain conditions, can result in explosive phenomena. The frequency and magnitude of these phenomena depend on the features of the non-polar liquid, such as chemical composition, viscosity, presence of contaminants, and also on the environmental conditions of use of the liquid, temperature, relative humidity, pressure and velocity, and on the features of the hydraulic system.

The filtering materials produced as multilayer of non-woven fabric made from insulating thermoplastic polymer materials have a high volumetric and surface resistivity which promotes the formation and the accumulation of electrostatic charges.

In order to overcome this problem, U.S. Pat. No. 6,099,726 describes the introduction of metal meshes into the filtering system.

US 2009/0078637 describes metal or chemical surface coatings.

US 2011/0005990 describes surface treatments.

The object of the present invention is to provide a fully incinerable filtering system, i.e. entirely devoid of fiberglass, with high mechanical, chemical and physical resistance, as well as with antistatic properties and a high accumulation power with respect to the prior art for polymer filters having equal filtering efficiency.

SUMMARY

A filtering multilayer is described, comprising at least two layers, one input layer and one output layer, made of non-woven fabric, wherein each fiber of said non-woven fabric consists of a polymer matrix of thermoplastic material, wherein the average diameter of the fibers that form the input layer is larger than the average diameter of the fibers that form the output layer, characterized in that the diameters of the fibers that form the input layer and the output layer have a Gaussian distribution, wherein the diameter of the single fibers that form said input layer varies around the average with a normal distribution of width at least equal to 10% of the average value and the diameter of the single fibers that form said output layer varies around the average with a normal distribution of width at least equal to 14% of the average value. In a preferred embodiment, said polymer matrix contains a carbon-based filler or additive, preferably in the form of powder.

DESCRIPTION OF THE FIGURES

The patent or application file may contain at least one drawing executed in color and/or one or more photographs. Copies of this patent or patent application publication with color drawing(s) will be provided by the Office upon request and payment of the necessary fee

DESCRIPTION OF THE INVENTION

Figure 1A:
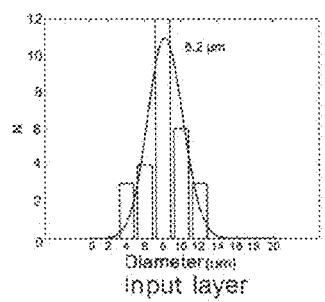
FIG. 1A-1C: Examples of possible distribution of the fiber diameters in a multilayer according to the present invention.

The invention relates to a fully incinerable and preferably antistatic polymer filtering multilayer for filtering fluids.

The multilayer of the invention comprises at least two layers, one input layer and one output layer, made of non-woven fabric, wherein each fiber of said non-woven fabric consists of a polymer matrix of thermoplastic material, wherein the average diameter of the fibers that form the input layer is larger than the average diameter of the fibers that form the output layer, characterized in that the diameters of the fibers that form the input layer and the output layer have a Gaussian distribution. Preferably, each fiber of said non-woven fabric consists of a polymer matrix of thermoplastic material admixed with a carbon-based filler or additive, preferably in the form of powder.

DETAILED DESCRIPTION OF THE INVENTION

The present invention describes and claims a filtering multilayer comprising at least two layers, one input layer and one output layer, made of non-woven fabric, wherein each fiber of said non-woven fabric consists of a polymer matrix of thermoplastic material, wherein the average diameter of the fibers that form the input layer is larger than the average diameter of the fibers that form the output layer, characterized in that the diameters of the fibers that form the input layer and the output layer have a Gaussian distribution, wherein the diameter of the single fibers that form said input layer varies around the average with a normal distribution of width at least equal to 10% of the average value and the diameter of the single fibers that form said output layer varies around the average with a normal distribution of width at least equal to 14% of the average value. Even more preferably, the diameter of the single fibers that form said input layer varies around the average with a normal distribution of width at least equal to 14% of the average value and the diameter of the single fibers that form said output layer varies around the average with a normal distribution of width at least equal to 19% of the average value.

In a preferred embodiment, the filtering multilayer of the present invention comprises at least two layers, wherein the average diameter of the fibers in said input layer is of between 6 and 15 µm and the distribution of the diameter of the single fibers that form said input layer varies around the average with a normal distribution of width at least equal to 14% of the average value, preferably of at least 15%; the average diameter of the fibers in said output layer is of between 1 and 6 µm, preferably between 3 and 5 µm and the distribution of the diameter of the single fibers that form said output layer varies around the average with a normal distribution of width at least equal to 19% of the average value, preferably of at least 20%.

Even more preferably, the average diameter of the fibers in said input layer is about 8 µm, with a normal distribution of width equal to 16% of the average value and the average diameter of the fibers in said output layer is about 3.6 µm, with a normal distribution of width equal to 22% of the average value.

The filtering multilayer of the present invention has a pressure drop of less than 7 kPa and an accumulation capacity greater than 19 mg/cm$^2$. Said pressure drop and accumulation capacity data are intended as measured according to Multipass Test ISO16889 carried out according to the following parameters: 3 l/min flow rate, delta-P Terminal (at the end of the test) 500 kPa, sample made with flat disk having a filtering area of 102 cm$^2$. All the pressure drop and accumulation capacity values shown in this description are intended as obtained by the aforementioned Multipass test ISO16889 and with the parameters mentioned above.

Further intermediate layers may optionally be provided between said input layer and said output layer. In this possible intermediate layers, the average diameter of the fibers decreases moving away from the input layer to the output layer.

In a further preferred embodiment, said multilayer comprises three layers, wherein the average diameter of the fibers in said input layer is about 8.2 µm, with a normal distribution of width of about 16% of the average value; the average diameter of the fibers in the intermediate layer is about 4.5 µm, with a normal distribution of width of about 16% of the average value and the average diameter of the fibers in said output layer is about 3.9 µm, with a normal distribution of width equal to about 22% of the average value.

In this embodiment, the multilayer has a mean flow pore size of about 18 µm, a filtering efficiency $\beta_{1000}$ of about 10 µm(c), a pressure drop lower than 5 kPa and an accumulation capacity higher than 20 mg/cm$^2$.

Said fibers forming the non-woven fabric used in the filtering multilayer of the present invention are preferably made of thermoplastic polyester, preferably they are made of PET, Nylon, polyesters, polycarbonate, polyethylenes, PBT or a mixture thereof. In a preferred embodiment, said fibers are made of PBT.

Figure 2:
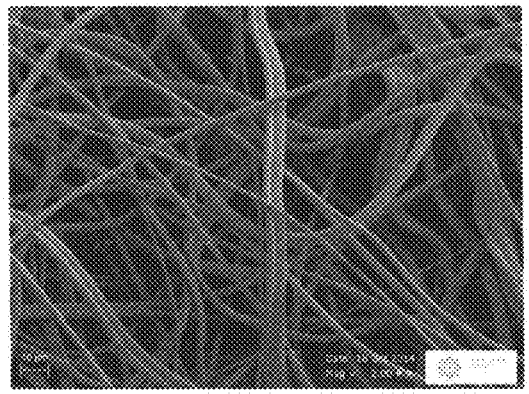
FIG. 2: Scanning electron microscope image of a PBT polymer multilayer according to the present invention.

FIG. 2 shows an electron microscope image where the morphology of the fibers present in a PBT multilayer according to the present invention is highlighted.

In a further embodiment, during the thermal process that leads to obtaining each of the non-woven fabric layers, at least one carbon-based filler or additive is dispersed into the polymer matrix, such as carbon black and graphite, in amounts of between 2-30% w/w. Said filler preferably is carbon black alone, with an average particle size of less than 50 nm, a surface area, as measured by the BET method, greater than 100 m$^2$/g and a pore volume greater than 100 cm$^3$/g.

Figure 3:
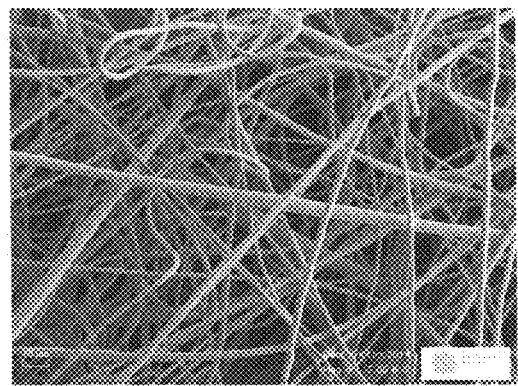
FIG. 3: Scanning electron microscope image of an antistatic PBT polymer multilayer according to the present invention.

FIG. 3 shows an electron microscope image where the morphology of the fibers present in an antistatic PBT multilayer according to the present invention is highlighted.

The surface resistivity of the non-woven fabric multilayer of the present invention is lower than $10^{10}\Omega$ and the volumetric resistivity is lower than $10^{10}$ $\Omega$-cm. In a preferred embodiment, the surface resistivity is of between $10^{^5}$ and $10^{^{10}}\Omega$ and the volumetric resistivity is of between $10^{^4}$ and $10^{^{10}}$ $\Omega$-cm. Such resistivity parameters make the multilayer of the present invention fall within the definition of antistatic. Said volumetric and surface resistivity data are intended to be obtained according to the ASTM D257 standard. All the volumetric and surface resistivity values shown in this description are intended to be obtained by the above ASTM D257 standard.

The thickness of each of the at least two layers that form the multilayer of the present invention is in the range of between 0.05 and 3 mm, preferably between 0.2 and 2 mm, even more preferably it is between 0.3 and 1 mm.

By way of comparison, a single layer having a thickness of about 0.5 mm, wherein said fibers are of PBT and have an average diameter of about 8 µm, with a normal distribution with a width equal to about 16% of the average value, if used individually has an accumulation capacity of about 13 mg/cm$^2$ and a filtering efficiency $\beta_{1000}$ of 12 µm(c) or greater.

Again by way of comparison, a single layer having a thickness of about 0.5 mm, wherein said fibers are of PBT and have an average diameter of about 3.9 µm, with a normal distribution of width equal to about 22% of the average value, if used individually has an accumulation capacity of about 14 mg/cm$^2$ and a filtering efficiency $\beta_{1000}$ lower than 12 µn(c).

By joining said two layers in a multilayer according to the present invention, the multilayer obtained by joining said input layer and said output layer leads to an accumulation capacity equal to or greater than 20 mg/cm$^2$ and to a filtering efficiency $\beta_{1000}$ lower than 12 µm(c).

In a further embodiment, a method is claimed for obtaining a filtering multilayer according to the present invention, wherein said method comprises:

Providing a polymer fiber, wherein said polymer fiber is fully incinerable, with which a layer is prepared, possibly deposited on a support material, wherein the fibers in said layer have an average diameter of between 6 and 15 µm and the distribution of the diameter of the single fibers that form said layer varies about the average with a normal distribution of width at least equal to 10%, preferably 14% of the average value, even more preferably of at least 15%;

Providing a polymer fiber, wherein said fiber is fully incinerable and is of the same or of a different material with respect to the fiber in step a), with which a layer is prepared, possibly deposited on a support material, wherein the fibers in said layer have an average diameter of between 1 and 6 µm, preferably between 3 and 5 µm, and the distribution of the diameter of the single fibers that form said layer varies about the average with a normal distribution of width at least equal to 14%, preferably 19% of the average value, even more preferably of at least 20%.

Optionally, providing further layers as described in steps a) and b), wherein these further layers will form the intermediate layers of said multilayer and will be characterized by an average diameter of the fibers which decreases moving away from the input layer to the output layer.

Joining said layer obtained in a) with said layer obtained in b) and, optionally, with said further layers obtained in c).

It has been shown that in a multilayer system like that of the present invention the distribution of the diameter of the fibers that form the single layers plays a key role in determining not only the filtering efficiency but also the accumulation capacity of said filter.

The present invention provides filters which, while not containing fiberglass, have an accumulation capacity comparable to that so far obtainable only with the use of fiberglass. With the fibers made of a polymer matrix admixed with a carbon-based filler/additive, the formation and the accumulation of electrostatic charges is strongly limited, thus allowing a safe use of the filters of the present invention also for applications related to oil filtration in hydraulic systems and fuel filtration.

Example 1

Figure 1B:
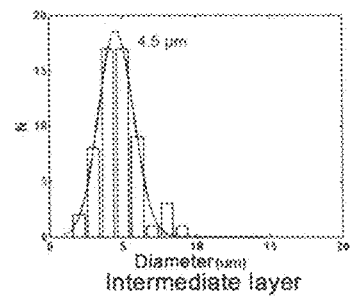
Figure 1C:
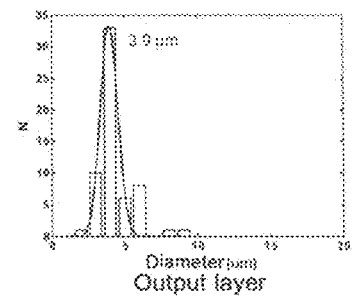

FIG. 1 shows the distribution of the diameter of the fibers present in a multilayer according to the present invention, comprising an input layer (1A), an output layer (1C) and an intermediate layer (1B).

The multilayer, as a whole, has an approximate mean flow pore size of about 18 µm, a $\beta_{1000}$ of about 12 µm(c), a pressure drop lower than 5 kPa and an accumulation capacity higher than 20 mg/cm² (data obtained according to Multipass Test ISO16889 with the parameters shown above).

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiment disclosed herein contemplated for carrying out this invention, but that the invention will include all embodiments falling within the scope of the claims.

What is claimed is:

1. A filtering multilayer comprising one input layer and one output layer made of non-woven fabric comprising fibers, wherein each fiber of said non-woven fabric consists of a polymer matrix of thermoplastic material, wherein the average diameter of the fibers that form the input layer is larger than the average diameter of the fibers that form the output layer, characterized in that the diameters of the fibers that form the input layer and the output layer have a Gaussian distribution, wherein the diameter of each of the fibers that form said input layer varies around the average with a normal distribution of width at least equal to 10% of the average value and the diameter of each of the fibers that form said output layer varies around the average with a normal distribution of width at least equal to 14% of the average value.

2. A filtering multilayer according to claim 1, wherein said diameter of the fibers that form said input layer varies around the average with a normal distribution of width at least equal to 14% of the average value and said diameter of the fibers that form said output layer varies around the average with a normal distribution of width at least equal to 19% of the average value.

3. A filtering multilayer according to claim 1, wherein the average diameter of the fibers in said input layer is between 6 and 15 µm and the average diameter of the fibers in said output layer is between 1 and 6 µm.

4. A filtering multilayer according to claim 1, wherein intermediate layers are provided between said input layer and said output layer in which the average diameter of fibers decreases moving away from the input layer to the output layer.

5. A filtering multilayer according to claim 1, wherein said multilayer comprises three layers, wherein the average diameter of the fibers in said input layer is about 8.2 µm, with a normal distribution of width of about 16% of the average value; the average diameter of the fibers in the intermediate layer is about 4.5 µm, with a normal distribution of width of about 16% of the average value and the average diameter of the fibers in said output layer is about 3.9 µm, with a normal distribution of width equal to about 22% of the average value.

6. A filtering multilayer according to claim 1, wherein said multilayer has a pressure drop lower than 7 kPa and an accumulation capacity higher than 19 mg/cm².

7. A filtering multilayer according to claim 1, wherein said multilayer has an efficiency as defined by β ratio, with particles having sizes up to 50 µm² and/or a mean flow pore size up to 60 µm.

8. A filtering multilayer according to claim 1, wherein said multilayer has a mean flow pore size of about 18 µm, an efficiency $\beta_{1000}$ of about 12 µm(c), a pressure drop lower than 5 kPa and an accumulation capacity higher than 20 mg/cm².

9. A filtering multilayer according to claim 1, wherein said multilayer is made of thermoplastic polyester selected from the group consisting of PET, Nylon, polyesters, polycarbonate, polyethylenes, PBT or a mixture thereof.

10. A filtering multilayer according to claim 1, wherein each of the layers that form said multilayer has a thickness in the range between 0.05 and 3 mm.

11. A filtering multilayer according to claim 1, wherein each fiber of said non-woven fabric consists of a polymer matrix of thermoplastic material admixed with at least one carbon-based filler or additive.

12. A filtering multilayer according to claim 11, wherein said at least one filler/additive is dispersed within said polymer matrix in amounts ranging between 2% and 30% by weight.

13. A filtering multilayer according to claim 11, wherein said filler is carbon black alone with average particle size smaller than 50 nm, surface area greater than 100 $m^2/g$ and pore volume greater than 100 $cm^3/g$.

14. A method for obtaining a filtering multilayer according to claim 1, comprising:
   a) providing a polymer fiber with which a layer of non-woven fabric is prepared, wherein the fibers in said layer have an average diameter of between 6 and 15 µm and the distribution of the diameter of the fibers that form said layer varies about the average with a normal distribution of width at least equal to 10;
   b) providing a polymer fiber, wherein said fiber is of the same or a of different material with respect to the fiber in step a), with which a layer of non-woven fabric is prepared, wherein the fibers in said layer have an average diameter of between 1 and 6 µm, and the distribution of the diameter of the fibers that form said layer varies about the average with a normal distribution of width at least equal to 14% of the average value;
   c) joining said layer obtained in a) with said layer obtained in b).

* * * * *